V. LOUGHEED.
HOLLOW PATTERN AND METHOD OF PRODUCING MOLDS.
APPLICATION FILED AUG. 18, 1919.
1,364,123. Patented Jan. 4, 1921.
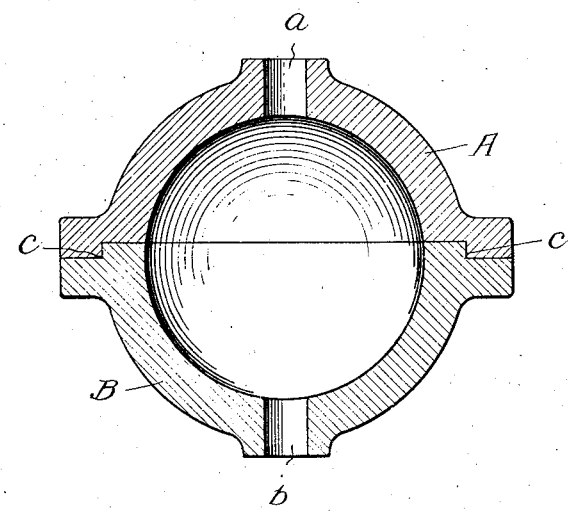
Witness:
G. Burkhardt
Inventor
Victor Lougheed,
By Harry T. Knight
Atty.

UNITED STATES PATENT OFFICE.

VICTOR LOUGHEED, OF SAN FRANCISCO, CALIFORNIA, ASSIGNOR TO ENTERPRISE FOUNDRY COMPANY, OF SAN FRANCISCO, CALIFORNIA, A CORPORATION OF CALIFORNIA.

HOLLOW PATTERN AND METHOD OF PRODUCING MOLDS.

1,364,123.   Specification of Letters Patent.   Patented Jan. 4, 1921.

Application filed August 18, 1919. Serial No. 318,206.

*To all whom it may concern:*

Be it known that I, VICTOR LOUGHEED, a citizen of the United States, residing at San Francisco, in the county of San Francisco and State of California, have invented new and useful Hollow Patterns and Methods of Producing Molds; and I do hereby declare the following to be a full, clear, and exact description of my invention, such as will enable others skilled in the art to which it appertains to make and use the same.

It has been the practice for many years to produce the molds for fine, accurate castings, such, for instance, as dental inlays, vases, ornaments, etc., by setting the mold material around a wax or other pattern which is easily removable by melting or destruction, so that the mold need not be opened to relieve it of the pattern; but serious limitations have been encountered in the commercializing of this practice for the repetitive production of machine parts, due mainly to the necessity for using in this method patterns so designed that they will withdraw readily from parted dies, and having only such interior cavities as can be produced by the withdrawal of corepins.

The object of the present invention is to remove this limitation and to make this process more generally available, and particularly for such cheap work as quantity production of machine parts. This is accomplished primarily by producing the pattern, not as an originally complete or integral body, but initially in parts, such, for instance, as might readily be produced in quantity by pressing the fusible material between dies and which will be readily adapted to be subsequently assembled for building up and constituting the complete pattern, and to have its core of mold material formed within it, and the mold proper formed as a complete envelop around it, and to have the connecting arm between the cavity filling body of mold material and the enveloping body of mold material formed simultaneously with said bodies, or otherwise connected therewith.

A compound pattern constructed in accordance with one part of the present invention, and which will serve to illustrate the novel method of producing molds, is shown in section in the accompanying drawing.

In this, the complete pattern consists of a flanged sphere, with the two openings $a$ and $b$ communicating with an interior cavity. This pattern is built up from the two halves A and B, which are separately made in individual dies and subsequently assembled before molding. In this illustration, the two halves A and B are matched together in registry by rabbeting the meeting faces of their flanges $c$, $c$. But I do not confine myself to the feature of matching the parts together in this way, since it is not an essential feature of my invention, but obviously in many constructions of simple as well as intricate patterns it might advantageously be superseded or supplemented by dowel pins, or a form of projection on one part interlocking with a recess on the other part, or even by simply cementing the parts of the pattern together. This latter practice is desirable in many instances, either as a substitute for or supplement to interlocking, as means of preventing intrusion of thin fins of mold material between the meeting faces of imperfectly matched parts of the pattern parts, with consequent defects in ultimate castings.

After the pattern is formed as described, its cavity is filled with a body of suitable mold material, its outer surface is surrounded with a body of the said material, and an arm extending through the wall of the pattern connects said bodies of mold material and remains integral therewith. The mold thus formed is then dried or otherwise hardened, and the pattern is removed by fusing, for instance as described in my co-pending application, Serial No. 318,207. When this procedure is carried out with a pattern forming the subject-matter of the present invention, the mold material which is introduced to fill the pattern cavity will remain as a perfect core, connected with and supported by the shell of the mold, and the hollow article to be formed can then be cast with a high degree of accuracy.

By this method of procedure, a novel construction of pattern will be produced which will contain the cavity feature as well as the other four features of the ultimate casting, thereby doing away with the necessity of separately produced pattern cores.

I claim:

1. The improvement in the art of producing molds for casting objects with cavities, which consists in first producing from a readily fusible substance initially separate parts of a pattern in form adapted to be assembled to build up the complete pattern with a cavity therein and with an opening through the wall of such pattern; then applying a body of mold forming material to the cavity of the pattern thus formed, to the opening through its wall, and to the exterior thereof; and then removing the pattern from the resultant mold space without disturbing the walls of the mold.

2. A pattern for castings with cavity, comprising a plurality of separately produced pattern elements constructed for assembly to build up the form of the ultimate casting, including the cavity features thereof; said pattern elements having their meeting faces constructed to enforce proper relative positions thereof in assembly to form a facsimile of the article to be cast, including the cavity thereof; said pattern having an opening through its wall connecting its cavity with its exterior, and being formed of a material that renders it removable from a mold by fusing.

Signed at Chicago, Illinois, this 25th day of July, 1919.

VICTOR LOUGHEED.